United States Patent
Park et al.

(10) Patent No.: US 10,867,017 B2
(45) Date of Patent: Dec. 15, 2020

(54) APPARATUS AND METHOD OF PROVIDING SECURITY AND APPARATUS AND METHOD OF EXECUTING SECURITY FOR COMMON INTERMEDIATE LANGUAGE

(71) Applicant: INKA ENTWORKS, INC., Seoul (KR)

(72) Inventors: Jung Geun Park, Seongnam-si (KR); Jin Seon Hong, Seoul (KR); Ju-Han Song, Seoul (KR); Seong Jo Lee, Goyang-si (KR)

(73) Assignee: INKA ENTWORKS, INC., Seoul (KR)

( * ) Notice: Subject to any disclaimer, the term of this patent is extended or adjusted under 35 U.S.C. 154(b) by 252 days.

(21) Appl. No.: 16/130,144

(22) Filed: Sep. 13, 2018

(65) Prior Publication Data

US 2019/0163884 A1    May 30, 2019

(30) Foreign Application Priority Data

Nov. 24, 2017    (KR) .................. 10-2017-0158127

(51) Int. Cl.
*G06F 21/14* (2013.01)
*G06F 21/60* (2013.01)
(Continued)

(52) U.S. Cl.
CPC ............. *G06F 21/14* (2013.01); *G06F 21/602* (2013.01); *G06F 21/78* (2013.01); *H04L 9/0631* (2013.01);
(Continued)

(58) Field of Classification Search
CPC ........ G06F 21/14; G06F 21/602; G06F 21/78; G06F 2221/0724; H04L 9/0894; H04L 9/0631; H04L 2209/12
See application file for complete search history.

(56) References Cited

U.S. PATENT DOCUMENTS

| 6,539,433 B1 * | 3/2003 | Tominaga | G05B 19/042 709/202 |
| 7,320,075 B2 * | 1/2008 | Sotoodeh | G06F 21/125 713/171 |

(Continued)

OTHER PUBLICATIONS

Free Dll files database, Mono.Security.DLL File Information, 2004, https://www.dll4free.com/mono.security.dll.html.*

*Primary Examiner* — Robert B Leung
*Assistant Examiner* — Thomas Ho
(74) *Attorney, Agent, or Firm* — Nixon & Vanderhye P.C.

(57) ABSTRACT

Disclosed are an apparatus and a method for providing security and an apparatus and a method for executing security to protect a common intermediate language. An apparatus for providing security storing an execution package generated by assembling an execution engine library and an intermediate language library generated by compiling a plurality of files includes: an intermediate language extraction unit configured to extract the intermediate language library from the execution package; and an encryption unit configured to provide a secure intermediate language library by encrypting the intermediate language library extracted from the intermediate language extraction unit through a first encryption algorithm and encrypting the encrypted intermediate language library through a second encryption algorithm, thereby protecting the common intermediate language from hacking.

10 Claims, 17 Drawing Sheets

(51) Int. Cl.
    *H04L 9/06*          (2006.01)
    *G06F 21/78*        (2013.01)
    *H04L 9/08*          (2006.01)

(52) U.S. Cl.
    CPC .... *H04L 9/0894* (2013.01); *G06F 2221/0724* (2013.01); *H04L 2209/12* (2013.01)

(56) References Cited

U.S. PATENT DOCUMENTS

| | | | |
|---|---|---|---|
| 7,962,798 B2 * | 6/2011 | Locasto | G06F 11/1438 714/38.1 |
| 8,423,789 B1 * | 4/2013 | Poo | G06F 21/602 380/44 |
| 8,756,439 B1 * | 6/2014 | Jannson | G06F 21/62 380/279 |
| 2003/0110131 A1 * | 6/2003 | Alain | G06F 21/6209 705/51 |
| 2006/0277539 A1 * | 12/2006 | Amarasinghe | G06F 21/54 717/168 |
| 2011/0252233 A1 * | 10/2011 | De Atley | H04L 9/0894 713/165 |
| 2014/0006347 A1 * | 1/2014 | Qureshi | G06F 21/53 707/621 |
| 2014/0059525 A1 * | 2/2014 | Jawa | G06F 8/54 717/162 |
| 2015/0302218 A1 * | 10/2015 | Fielder | G06F 21/6209 713/193 |
| 2016/0203087 A1 * | 7/2016 | Nam | G06F 8/65 713/191 |

* cited by examiner

APPARATUS AND METHOD OF PROVIDING SECURITY AND APPARATUS AND METHOD OF EXECUTING SECURITY FOR COMMON INTERMEDIATE LANGUAGE

This application claims priority to KR Patent Application No. 10-2017-0158127 filed Nov. 24, 2017, the entire contents of which are hereby incorporated by reference.

BACKGROUND OF THE INVENTION

1. Field of the Invention

The present disclosure relates to an apparatus and a method of providing security and an apparatus and a method of executing security for a common intermediate language, and more particularly to an apparatus and a method of providing security and an apparatus and a method of executing security for a common intermediate language of a program written in a script language.

2. Description of the Prior Art

Although applications perform the same task, the applications should be programmed individually to operate according to hardware or operating system. That is, the same applications, for example, the same game program may be executed in various environments such as a PC, a Mac, a web browser, flash, an Android phone, and an iPhone, but source code of the game program should be individually developed according to a platform. Accordingly, development and maintenance costs of the game program increase. If one source code is reused regardless of hardware or operating system, the costs can be significantly reduced.

Recently, due to appearance of smart phones, the need to reuse a program has further increased and most mobile games are actually manufactured by a development tool such as a game engine reflecting the characteristic. Representative cross platform game engines include Unity, Havok Vision, and COCOS2D, and particularly, Unity is a cross platform game engine that supports C#, JavaScript, and Boo as a language for making a game script.

However, although a program made with the program language C# is compiled, the program is not directly converted into a machine language but is converted into binary code of an intermediate language in the form of a Common Intermediate Language (CLI) and included in a game packet as a file having the extension of dll. In order to execute the common intermediate language code, means for converting the common intermediate language such as .NET Framework, mono, and JVM are necessary into the machine language and executing the machine language.

However, the form of the common intermediate language is completely known and tools for completely reconstructing the common intermediate language to the original script source code and expressing it are already provided, so that an important game logic source can be read by means of inverse analysis through reverse engineering and even it is very easy for an attacker to rebuild the dll by modifying code as desired and distribute the cracked version.

When the script of C# is made, it is possible to some extent to make the program analysis by means of reverse engineering more difficult by changing a method name or a parameter name through the application of a code obfuscation scheme, but it is not possible to basically remove a weak point in that the source code can be shown.

Further, a method of making a logic for detecting a hacking attack with an Android Native Development Kit (NDK) file and calling the file from Java or C# script and protecting the same is used sometimes, but Java is also a language which is converted into the intermediate language and executed like C#, so that the source code is easily leaked and modulated and thus an attacker can very easily neutralize the security logic.

SUMMARY OF THE INVENTION

In order to solve the problem, an aspect of the present disclosure is to provide an apparatus and a method for providing security to protect a common intermediate language from hacking by providing security to an intermediate language library.

Another aspect of the present disclosure is to provide an apparatus and a method for executing security to protect a common intermediate language from hacking by executing security in an intermediate language library.

In accordance with an aspect of the present disclosure, an apparatus for providing security storing an execution package generated by assembling an execution engine library and an intermediate language library generated by compiling a plurality of files is provided. The apparatus includes: an intermediate language extraction unit configured to extract the intermediate language library from the execution package; and an encryption unit configured to provide a secure intermediate language library by encrypting the intermediate language library extracted from the intermediate language extraction unit through a first encryption algorithm and encrypting the encrypted intermediate language library through a second encryption algorithm.

The apparatus may further include a file replacement unit configured to replace the intermediate language library of the execution package with the secure intermediate language library encrypted by the encryption unit and replace a mono file of the execution package with a secure mono file including an image structure and a decryption unit which corresponds to the encryption unit.

The apparatus may further include a secure file generation unit configured to generate a secure file by encrypting an encryption key value of the first encryption algorithm through the second encryption algorithm.

The apparatus may further include a package assembly unit configured to generate a security execution package by assembling the execution engine library, the secure intermediate language library and the secure mono file replaced by the file replacement unit, and the secure file provided by the secure file generation unit.

When the secure intermediate language library is executed, the secure mono file may load the secure intermediate language library into a main memory as one image and store in the image structure a start address of each part of the decrypted intermediate language library in order to access an execution code.

The first encryption algorithm may be an XOR operation algorithm, and the second encryption algorithm may be an Advanced Encryption Standard (AES) algorithm.

In accordance with another aspect of the present disclosure, an apparatus for executing security is provided. The apparatus includes: an execution engine unit configured to load a secure intermediate language library, generated by encrypting an intermediate language library through a first encryption algorithm and encrypting the encrypted intermediate language library through a second encryption algorithm, into a main memory according to an operation in an execution engine library; an image structure configured to, when the secure intermediate language library is loaded into the main memory, perform an initialization task required for the secure intermediate language library and fetch a first decryption function interface related to the first encryption algorithm and a second decryption function interface related to the second encryption algorithm from a secure file; and a decryption unit configured to decrypt the encrypted secure intermediate language library through the second decryption function interface fetched from the image structure and maintain the encrypted intermediate language library in an intermediate language library region of the main memory.

The decryption unit may decrypt header-related information of the encrypted intermediate language library to the original intermediate language library through the first decryption function interface fetched from the image structure, store in a memory region other than the intermediate language library region at least one piece of the header-related information of the intermediate language library, and store in the image structure a location of the header-related information stored in the memory region other than the intermediate language library region.

When the header-related information is stored in the memory region other than the intermediate language library region, the decryption unit may scramble the intermediate language library region in which the header-related information is stored or populate the intermediate language library region with meaningless values.

In accordance with another aspect of the present disclosure, a method of providing security is provided. The method includes: storing an execution package generated by assembling an execution engine library and an intermediate language library generated by compiling a plurality of files; extracting the intermediate language library from the execution package; encrypting the intermediate language library extracted from the execution package through a first encryption algorithm; and generating a secure intermediate language library by encrypting the encrypted intermediate language library through a second encryption algorithm.

In accordance with another aspect of the present disclosure, a method of executing security is provided. The method includes: loading a secure intermediate language library, generated by encrypting an intermediate language library through a first encryption algorithm and encrypting the encrypted intermediate language library through a second encryption algorithm, into a main memory according to an operation in an execution engine library; when the secure intermediate language library is loaded into the main memory, performing an initialization task required for the secure intermediate language library; fetching a first decryption function interface related to the first encryption algorithm and a second decryption function interface related to the second encryption algorithm from a secure file; and decrypting the encrypted secure intermediate language library through the second decryption function interface and maintaining the encrypted intermediate language library in an intermediate language library region of the main memory.

According to the above-described configuration, the present disclosure can defend against the static analysis attack for an intermediate language library. That is, since the DLL is decrypted and executed on a main memory, it is possible to completely defend against the static analysis attack.

According to the present disclosure, although a secure intermediate language library is decrypted on the main memory through an AES algorithm, since the XOR operation is overall performed, the intermediate language library can be protected from hacking.

According to the present disclosure, since header-related information is distributed across the entire main memory and header-related information within the DLL region is scrambled, even though a hacker discovers an address of the DLL region, the hacker cannot find information for mapping code information of the DLL within the DLL region.

DETAILED DESCRIPTION OF THE EXEMPLARY EMBODIMENTS

Hereinafter, preferable embodiments of an apparatus and a method of providing security and an apparatus and a method of executing security for a common intermediate language according to the present disclosure will be described with reference to the accompanying drawings. For reference, in the following description, the terms referring to elements of the present disclosure are named in consideration of functions of the elements, and thus should not be construed to limit technical elements of the present disclosure.

Figure 1:
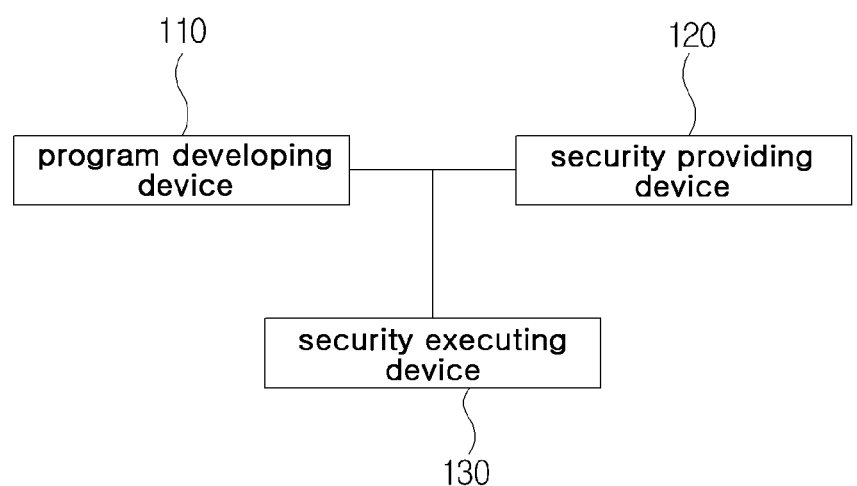
FIG. 1 is a block diagram illustrating a security providing system for a common intermediate language according to an embodiment of the present disclosure.

FIG. 1 is a block diagram illustrating a security providing system for a common intermediate language according to an embodiment of the present disclosure.

As illustrated in FIG. 1, the security providing system for the common intermediate language according to the present disclosure includes a program developing device 110, a security providing device 120, and a security executing device 130. The program developing device 110, the security providing device 120, and the security executing device 130 may be connected through a wired/wireless communication network.

The program developing device 110 is a device through which a developer develops an application program. When an application program is developed, an execution engine, for example, a unity engine, creates a binary code by compiling application source codes and creates an execution package, for example, a unity package including the created binary code and a necessary resource library.

The security providing device 120 is a device for providing security for the unity package created by the program developing device 110. When the unity package created by the program developing device 110 is uploaded, the security providing device 120 extracts a common intermediate language library, for example, a DLL, performs double-encryption using the extracted DLL, replaces a mono file with a secure mono file modified according to the double-encryption, and then creates a secure unity package again.

The security executing device 130 is a user terminal device for executing a program, for example, a game program. The security executing device 130 may download a secure unity package from the program developing device 110 or the security providing device 120 and execute a game program.

Although FIG. 1 illustrates the program developing device 110 and the security providing device 120 as separate device, this is only an example and the present disclosure is not limited thereto.

Figure 2:
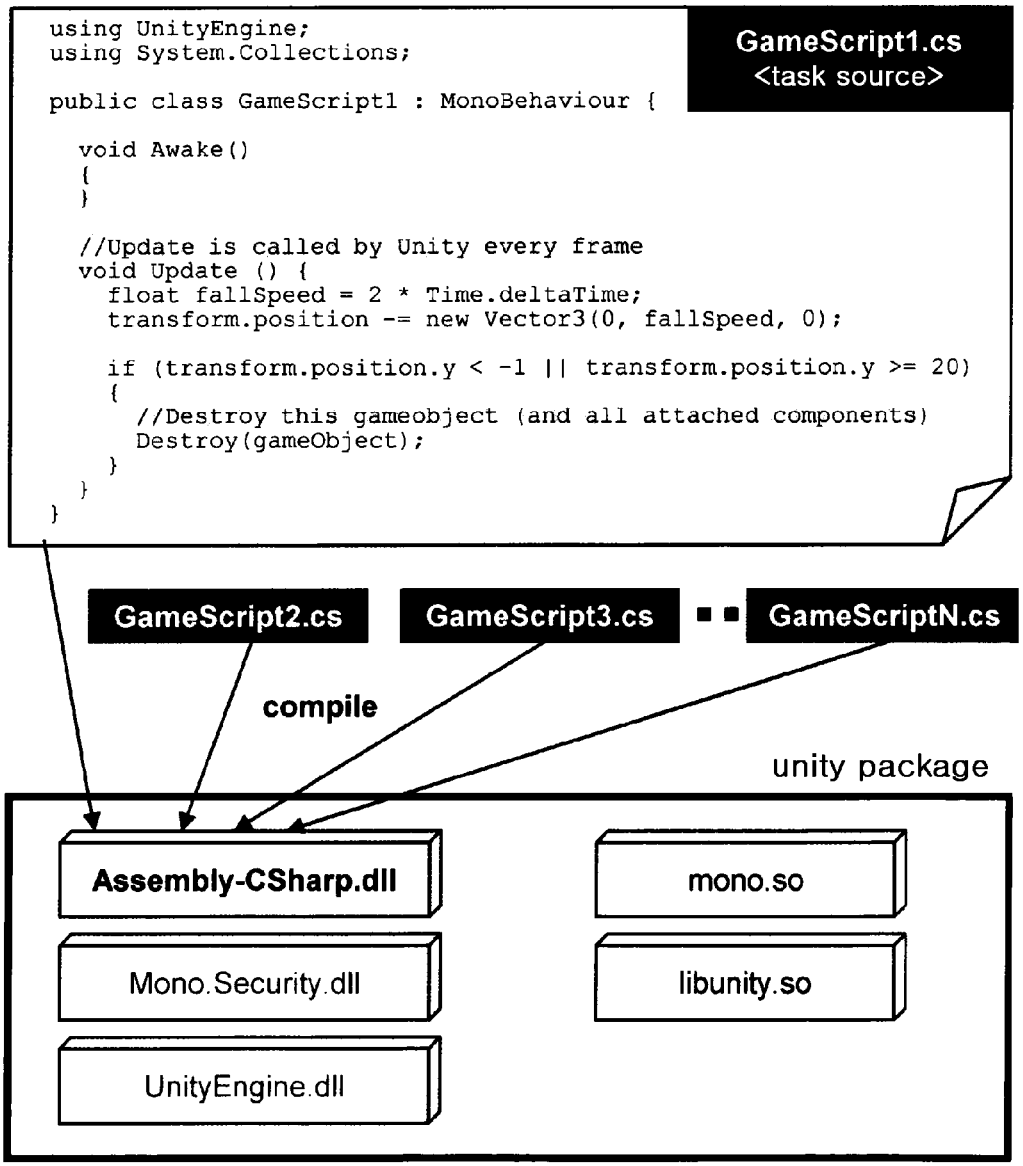
FIG. 2 illustrates an example of a general unity package generating method in a program developing device of FIG. 1.
Figure 3:
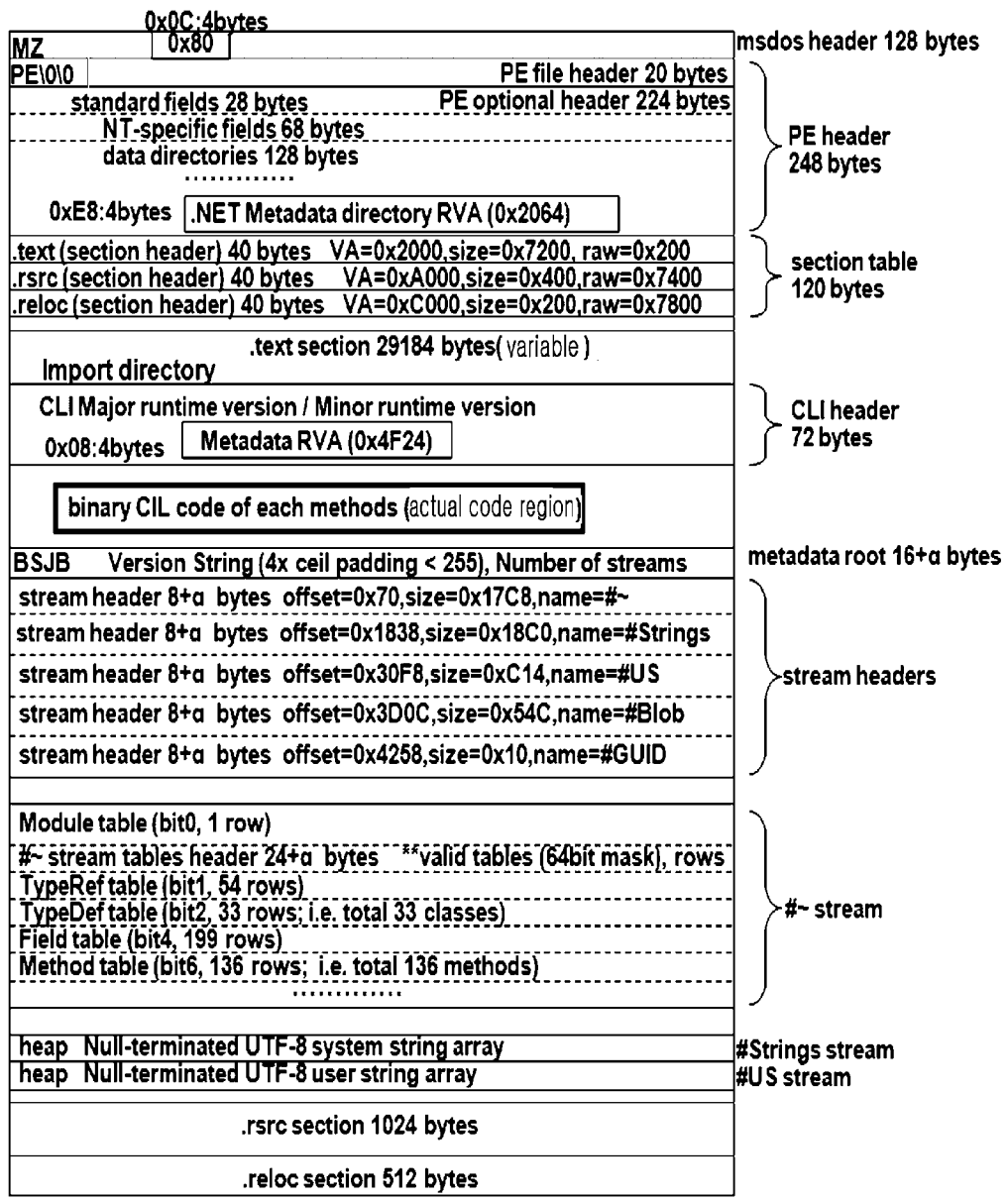
FIG. 3 illustrates the structure of a DLL illustrated in FIG. 2.

FIG. 2 illustrates an example of a common unity package creating method in the program developing device of FIG. 1, and FIG. 3 illustrates the structure of the DLL illustrated in FIG. 2.

As illustrated in FIG. 2, the unity engine creates a library of Assembly-CSharp.dll of a common intermediate language by compiling script files, for example, GameScript1.cs, GameScript2.cs, GameScript3.cs, . . . GameScriptN.cs. Further, the unity engine creates a unity package including the created Assembly-CSharp.dll and unity engine-related resource libraries, for example, Mono.Security.dll, UnityEngine.dll, mono.so, and libunity.so into.

As illustrated in FIG. 3, the structure of the DLL includes a PE header, a section table, a text section, a CLI header, BSJB (stream headers), stream information (#~stream), and a strings stream.

The PE header includes DLL information such as a build time and a code size, and a CLI header location within the text section may be detected according to the present disclosure. The section table includes information for calculating location information (RVA) of each section and a text section location may be detected according to the present disclosure. The text section is a region having actual execution codes made with the DLL and also has information for parsing information on the execution codes. Operation of an application program may be determined through the text section since the text section includes the actual execution codes according to the present disclosure.

The CLI header includes information required for accessing a code made with the common intermediate language (CLI) and a BSJB location may be detected through the CLI header according to the present disclosure. The BSJB has location information of #~stream and Strings stream, and thus the location of #~stream may be detected according to the present disclosure. Stream information includes information on a class within dll such as a module, reference, definition, or a method and, particularly, method information includes an execution code location of a function of a corresponding name in the text section, and an execution code location of each function may be detected according to the present disclosure. The strings stream may store in the form of strings an actual function name such as a class name, a function name, or a field name, or a value used for initialization, and string values may be referenced by this region even in runtime.

Figure 4:
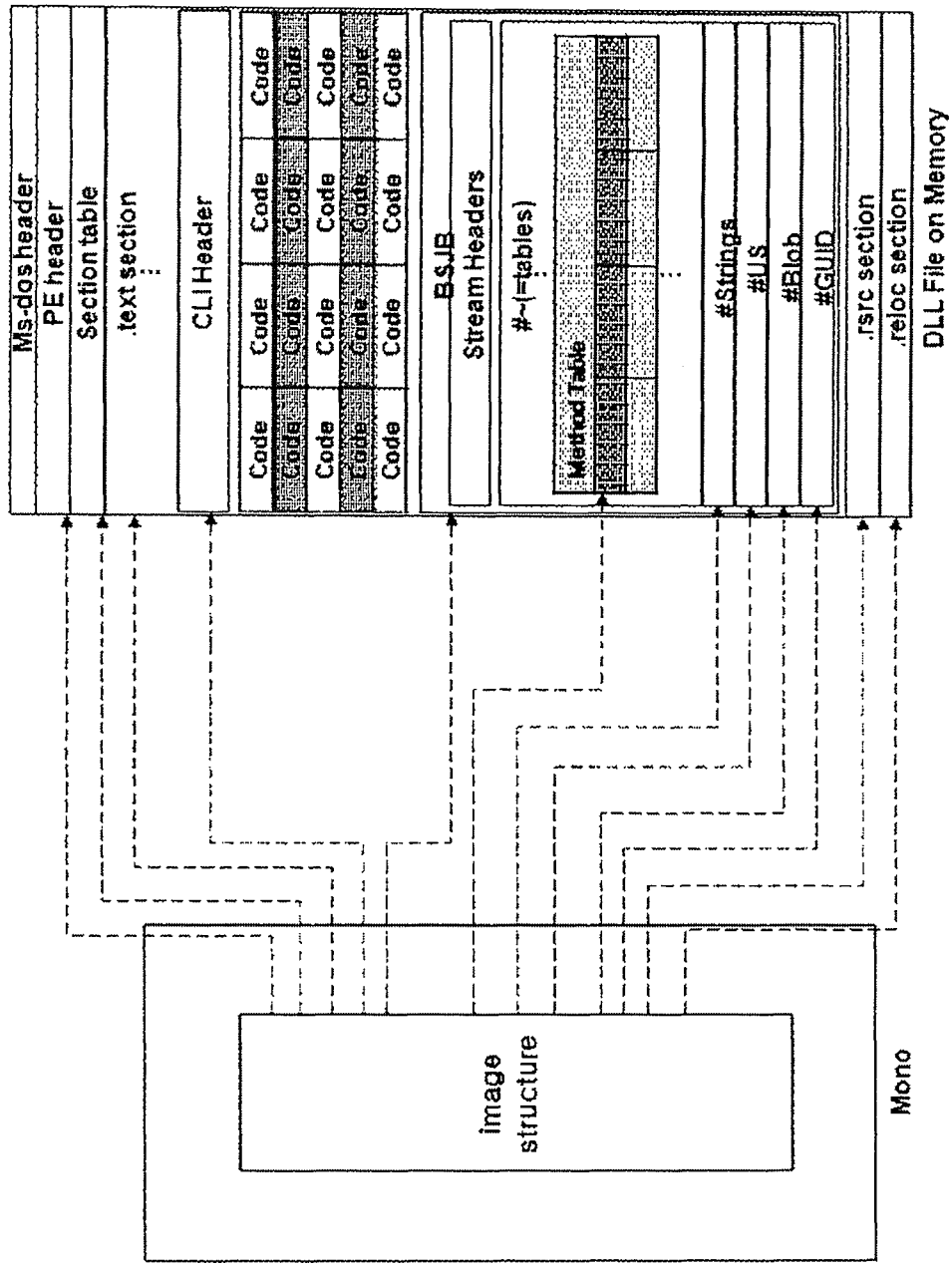
FIG. 4 illustrates an example of an image structure of a secure mono file according to the present disclosure.

FIG. 4 illustrates an example of an image structure of a secure mono file according to the present disclosure.

The secure mono file is a kind of virtual machine for executing a CLI-based C# code in an operating system that is not the Window environment. As illustrated in FIG. 4, the secure mono file loads the entire DLL into memory as one image when the DLL is executed and accesses a code region based thereon. Further, in order to access the code, a start memory address of each part of the DLL is stored in the image structure 820 within the mono file.

In the secure mono file, the DLL is actually encrypted. Accordingly, in order to apply security, before the DLL is open to access actual information, the encrypted DLL loaded into the memory should be decrypted and start memory addresses of parts should be stored in the image structure according to decrypted values. If the entire DLL is decrypted at a time, the decrypted values are all loaded into the memory, so that hackers can dynamically extract the original DLL from the memory through a magic keyword or a DOS header during loading of the DLL. In order to prevent this, according to the present disclosure, the DLL may be doubly encrypted, and only necessary parts may be decrypted at a loading time point and used.

Figure 5:
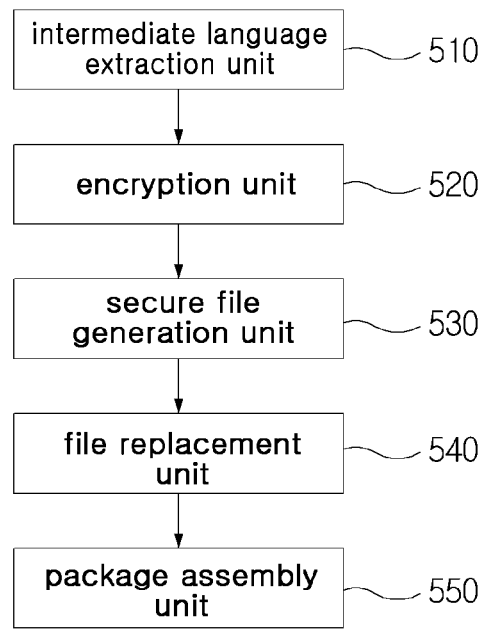
FIG. 5 is a block diagram illustrating the security providing device of FIG. 1.
Figure 6:
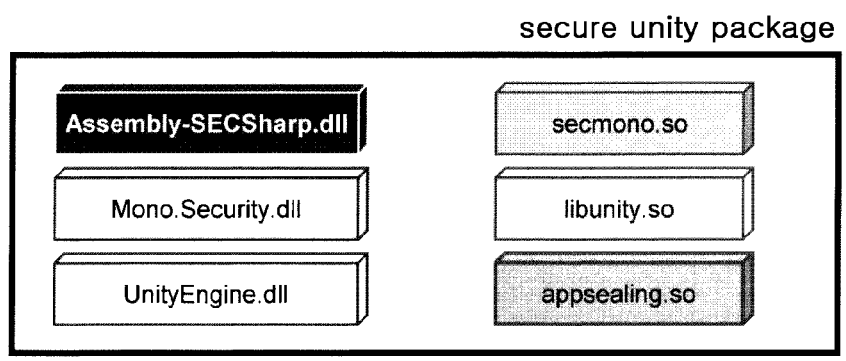
FIG. 6 illustrates a secure unity package re-assembled in the security providing device of FIG. 5.

FIG. 5 is a block diagram illustrating the security providing device of FIG. 1, and FIG. 6 illustrates a secure unity package assembled again in the security providing device of FIG. 5.

As illustrated in FIG. 5, the security providing device 120 includes a common intermediate language extraction unit 510, an encryption unit 520, a secure file generation unit 530, a file replacement unit 540, and a package assembly unit 550.

The common intermediate language extraction unit 510 parses a plurality of libraries and files of the unity package uploaded from the program developing device 110 and extracts a common intermediate language library, for example, Assembly-CSharp.dll illustrated in FIG. 2.

The encryption unit 520 encrypts the entire DLL, for example, Assembly-CSharp.dll illustrated in FIG. 2 through a first encryption algorithm. The first encryption algorithm may perform an XOR operation on the entire DLL using, for example, an XOR key. In this case, the first encryption algorithm may perform encryption by scrambling per block unit.

The encryption unit 520 generates a secure intermediate language library by encrypting through a second encryption algorithm the entire DLL that has been encrypted through the first encryption algorithm. The second encryption algorithm may include at least one of encryption algorithms such as DES, AES, and RSA. Here, as the second encryption algorithm, it is preferable to use an Advanced Encryption Standard (AES) algorithm for encrypting the encrypted entire DLL.

As the encryption unit 520 encrypts a first encryption key value of the first encryption algorithm through the second encryption algorithm, the secure file generation unit 530 may generate a secure file, for example, appsealing.so illustrated in FIG. 6 and store in the generated secure file a first decryption function interface related to the first encryption algorithm and a second decryption function interface related to the second encryption algorithm.

Figure 8:
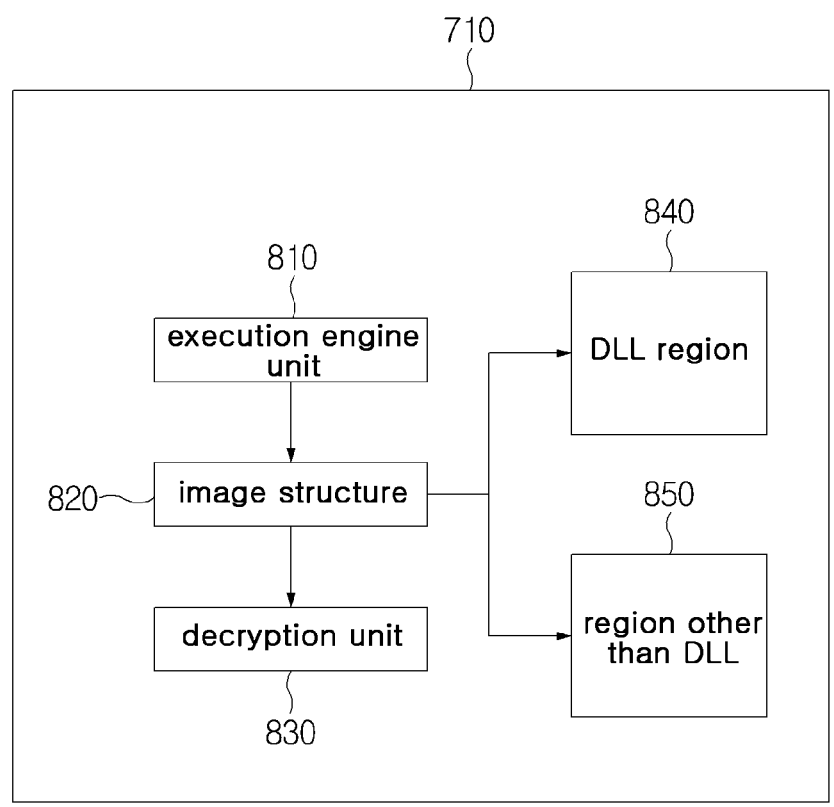
FIG. 8 illustrates a state in which a security execution program is loaded into a main memory unit according to an embodiment of the present disclosure.

The file replacement unit 540 replaces an intermediate language library of the unity package with a secure intermediate language library, for example, a secure DLL generated by the encryption unit 520 and replace a mono file of the unity package with a secure mono file including an image structure 820 illustrated in FIG. 8 and a decryption unit 830 which corresponds to the encryption unit 520.

The unity package assembly unit 550 re-assembles the secure DLL, for example, Assembly-SECSharp.dll that is the secure intermediate language library replaced by the file replacement unit 540, the secure mono file, for example, secmono.so, the secure file appsealing.so, and necessary resource libraries into the unity package.

Figure 7:
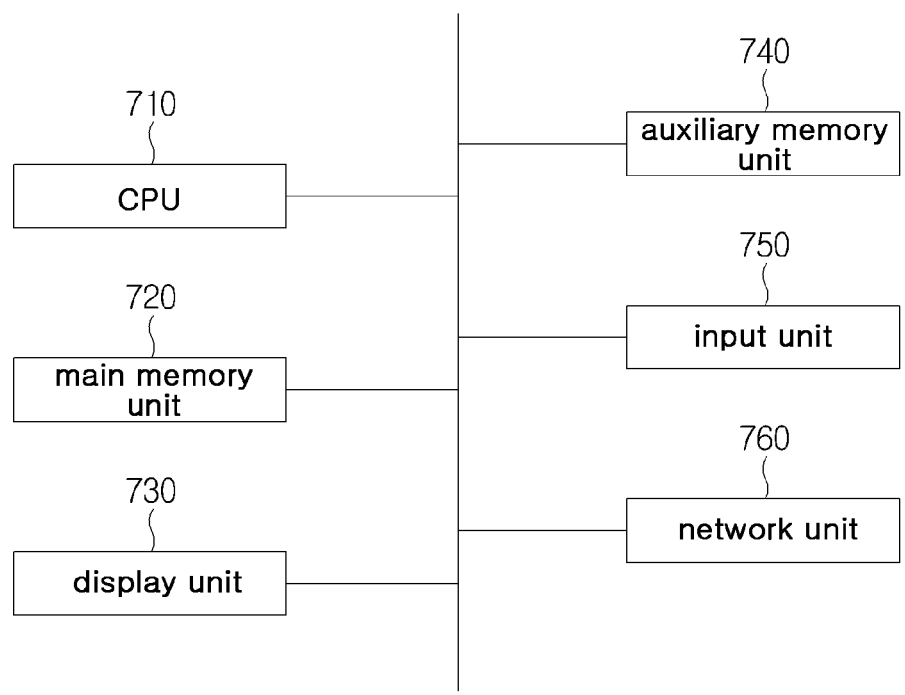
FIG. 7 is a block diagram illustrating the security executing device of FIG. 1.

FIG. 7 is a block diagram illustrating the security executing device of FIG. 1.

As illustrated in FIG. 7, the security executing device 130 may include a CPU 710, a main memory unit 720, a display unit 730, an auxiliary memory unit 740, an input unit 750, and a network unit 760.

The auxiliary memory unit 740 stores a security execution package downloaded from the security providing device 120 through the network unit 760. When a security execution package, for example, a secure unity package of the game program is requested, the CPU 710 loads the secure unity package stored in the auxiliary memory unit 740 into the main memory unit 720. Meanwhile, the game program may receive a new value through the input unit 750 or the network unit 760.

The security executing device 130 according to an embodiment of the present disclosure may be a user terminal such as a Personal Computer (PC), a notebook computer, a tablet, a Personal Digital Assistant (PDA), a game console, a Portable Multimedia Player (PMP), a PlayStation Portable (PSP), a wireless communication terminal, a smart phone, a TV, or a media player.

FIG. 8 illustrates a state in which a security execution program is loaded into the main memory unit according to an embodiment of the present disclosure. FIGS. 9A to 9H illustrate an operation of the security execution program of FIG. 8.

As illustrated in FIG. 8, the security execution program includes an execution engine unit 810, an image structure 820, and a decryption unit 830.

The execution engine unit 810 loads the secure intermediate language library, for example, the secure DLL into the main memory unit 720 according to an execution engine in the execution engine library.

When the secure intermediate language library is loaded into the main memory unit 720, the image structure 820 performs an initialization task required for the secure intermediate language library and fetches a first decryption function interface related to the first encryption algorithm and a second decryption function interface related to the second encryption algorithm from the secure file.

The decryption unit 830 decrypts the encrypted secure intermediate language library through the second decryption interface fetched from the image structure 820 and maintains the encrypted intermediate language library in an intermediate language library region 840 of the main memory unit 720, for example, a DLL region. The decryption unit 830 decrypts header-related information of the encrypted intermediate language library to the original intermediate language library through the first decryption function interface fetched from the image structure 820, stores in a memory region 850 other than the intermediate language library region at least one piece of the header-related information of the intermediate language library, and stores in the image structure 820 a location of the header-related information stored in the memory region 850 other than the intermediate language library region. When the header-related information is stored in the memory region 850 other than the intermediate language library region, the decryption unit 830 scrambles the intermediate language library region 840 in which the header-related information is stored or populates the intermediate language library region 840 with meaningless values.

Hereinafter, the operation of the security execution program will be described in more detail with reference to FIG. 9.

When an application, for example, a game application is executed through the input unit 750 in the security executing device 130, the CPU 710 loads the game program into the main memory unit 720. When the game program loaded into the main memory unit 720 is executed, the DLL, for example, Assembly-SECSharp.dll is loaded according to the execution engine unit 810.

When the DLL is loaded, the image structure 820 performs in the existing logic an initialization task required for DLL image decryption. The image structure 820 fetches the second decryption function interface related to the second encryption algorithm of the encryption unit 520, for example, an AES decryption function pointer, and fetches the first decryption function interface related to the first encryption algorithm, for example, an XOR decryption function pointer.

When there is a keyword indicating that the DLL is encrypted in a particular byte of an MS-DOS header, the decryption unit 830 decrypts the entire DLL region through the second decryption algorithm. When the encryption unit performs encryption through AES, decryption is performed to have the decrypted secure DLL through an AES decryption algorithm. In this case, the DLL in the DLL region of the main memory unit is still the DLL encrypted by means of the first encryption algorithm (see FIG. 9A).

The decryption unit 830 decrypts the header-related information to be original through the second decryption algorithm, and then store in the image structure 820 locations thereof and scrambles regions of the header-related information (see FIGS. 9B to 9G).

The process of decrypting the header-related information through the second decryption algorithm will be described below in more detail.

Figure 9A:
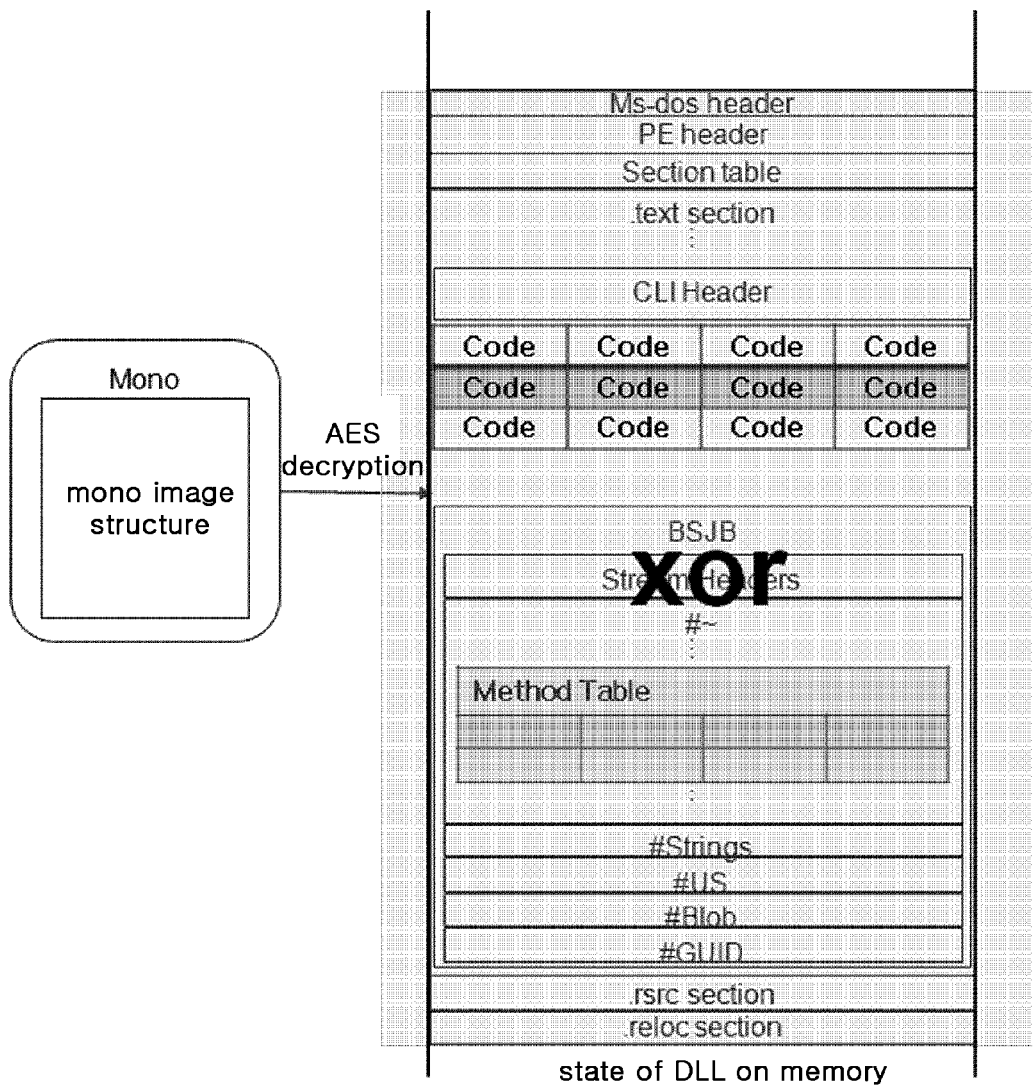
FIGS. 9A to 9H illustrate an operation of the security execution program of FIG. 8.
Figure 9B:
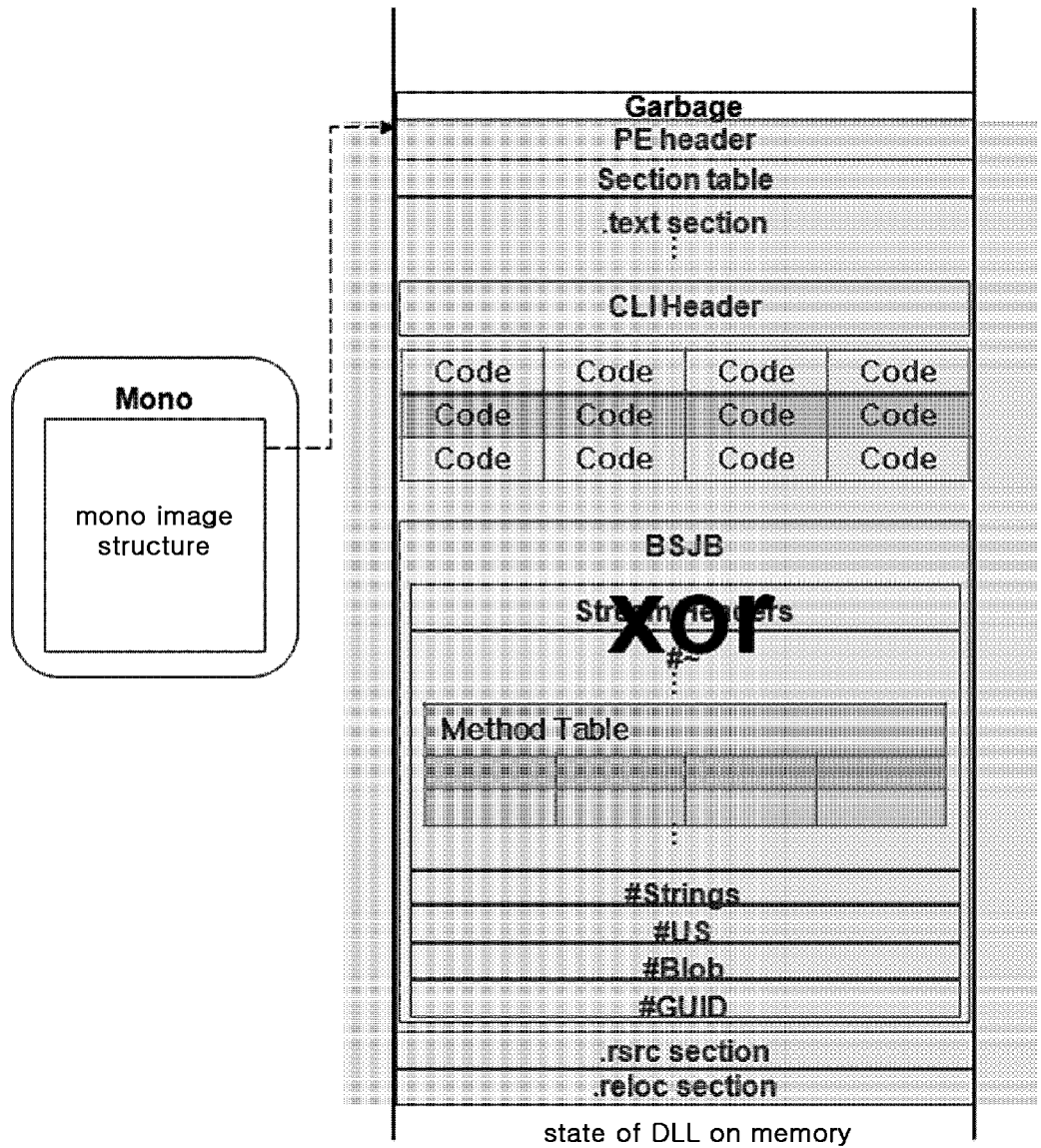
Figure 9C:
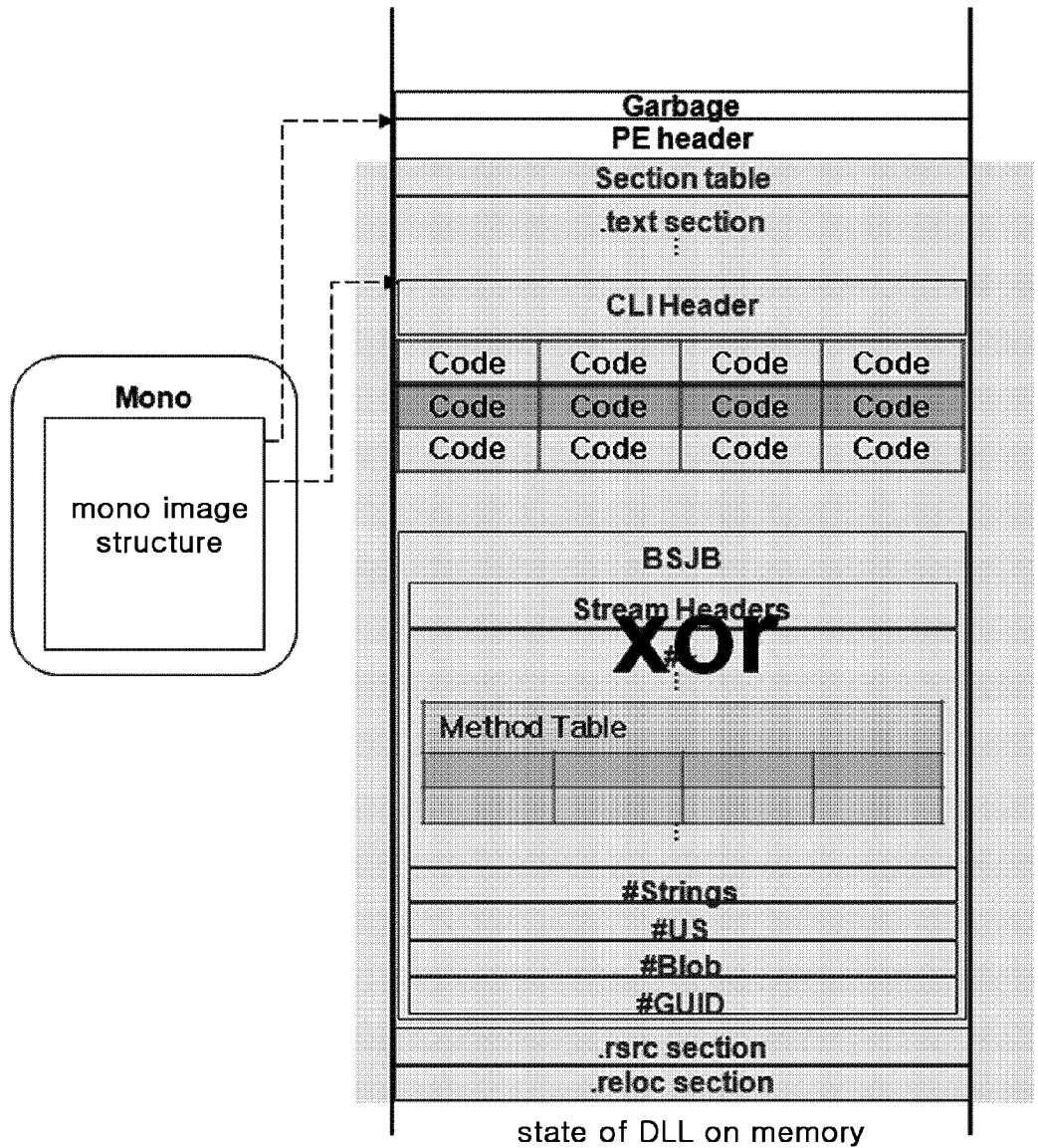
Figure 9D:
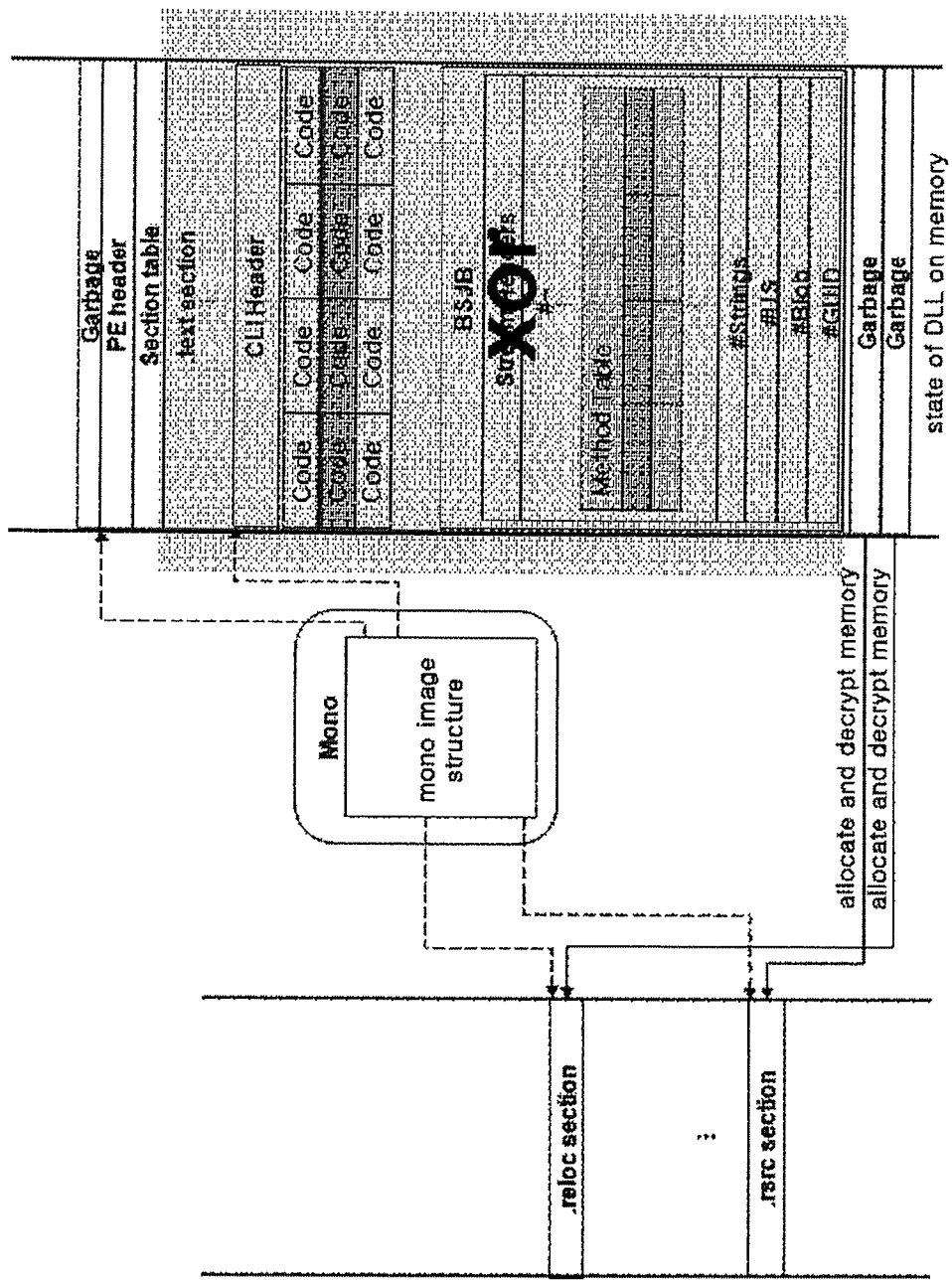
Figure 9E:
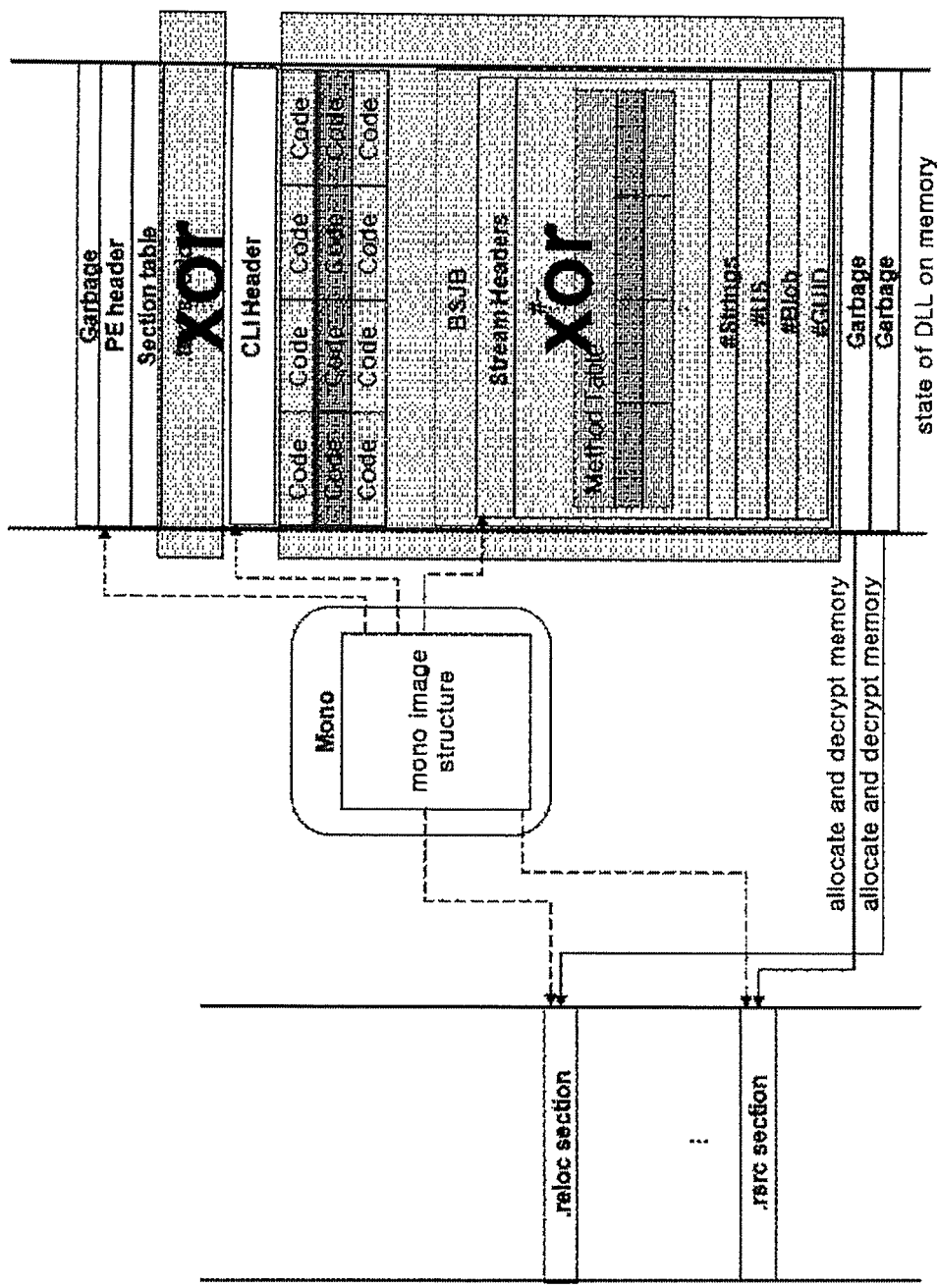
Figure 9F:
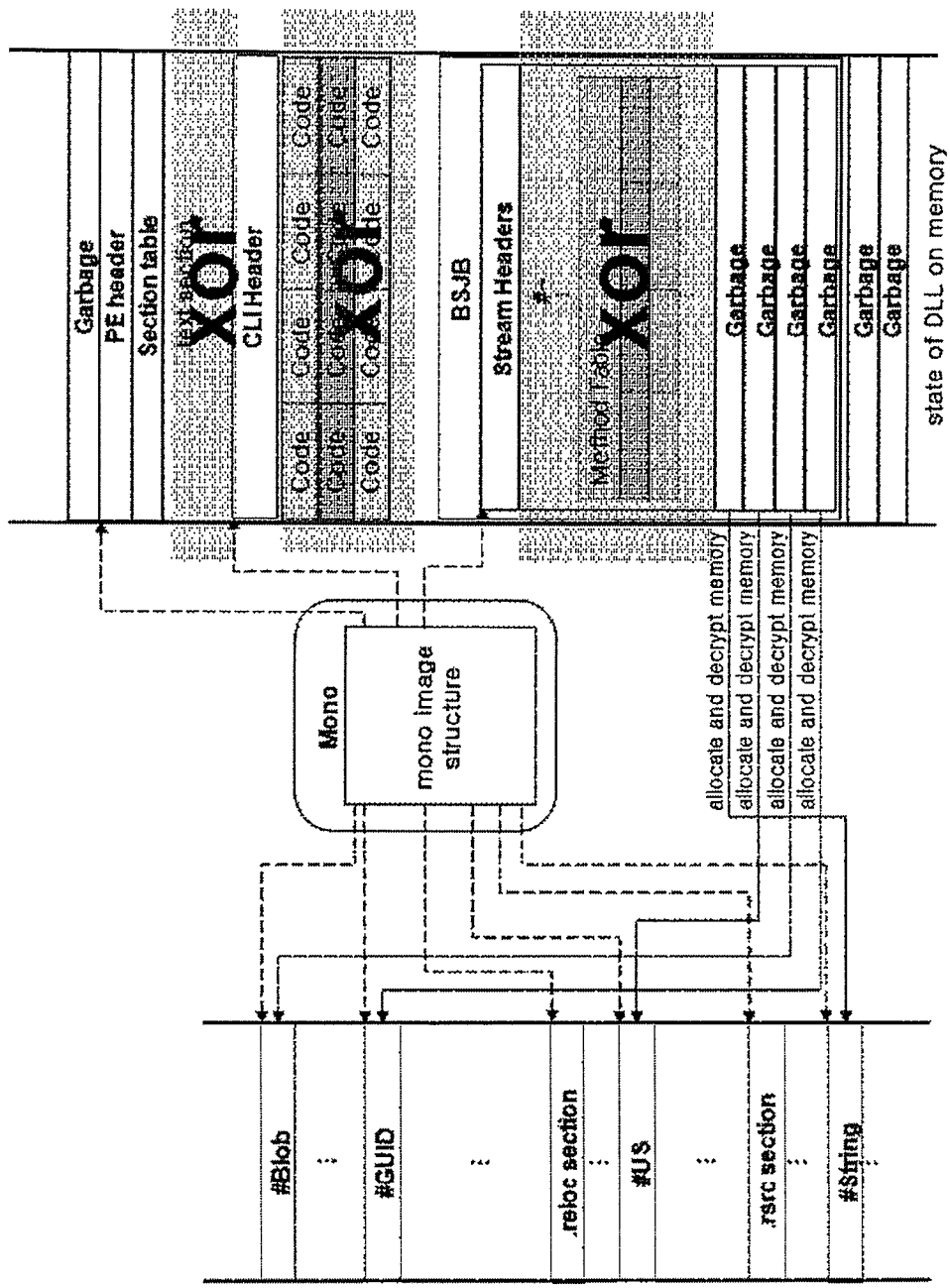
Figure 9G:
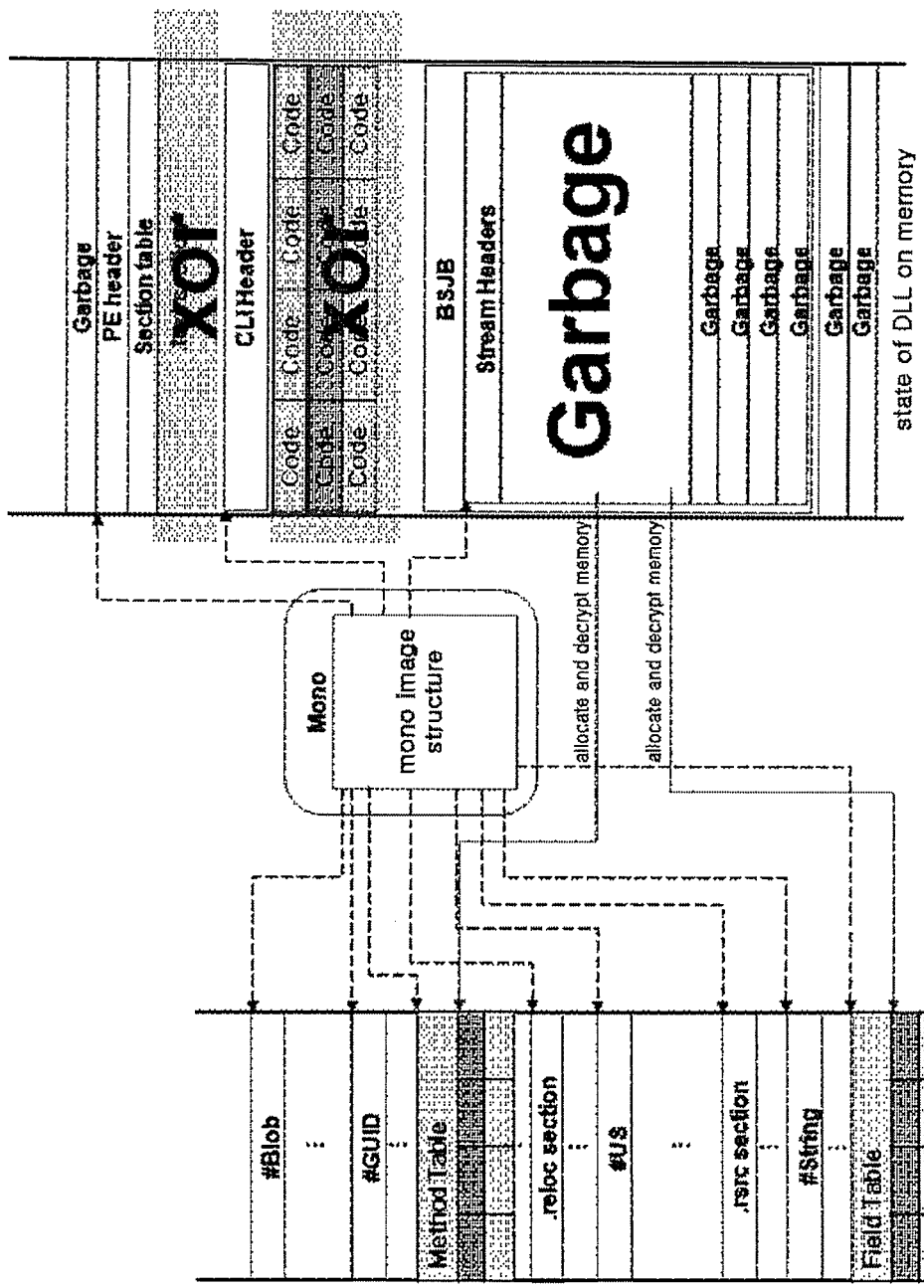
Figure 9H:
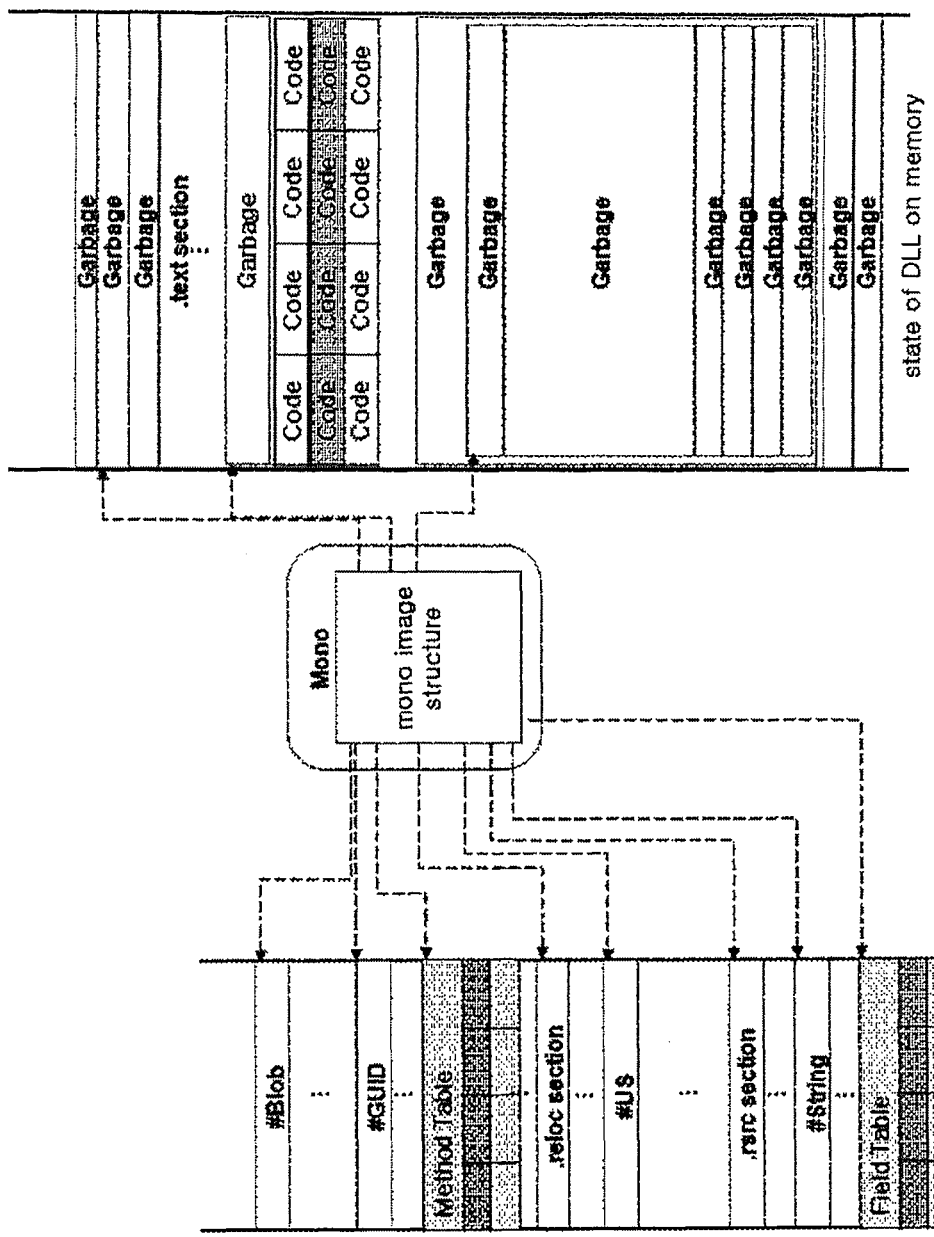

The decryption unit 830 first decrypts an XOR-operated MS-DOS header to be original by performing an XOR operation, stores in the image structure 820 a location of a PE header and scrambles the MS-DOS header (see FIG. 9B).

The decryption unit 830 decrypts the XOR-operated PE header to be original by performing the XOR operation and stores in the image structure 820 a location of a CLI header within the text section. The decryption unit 830 also deletes a keyword of the PE header, so that the DLL region cannot be found through a keyword search in the memory (see FIG. 9C).

The decryption unit 830 decrypts an XOR-operated section table to be original by performing the XOR operation on it, decrypts the remaining section regions except for the text section with reference to the section table, and stores in the memory region other than the DLL region the decrypted remaining section regions. The decryption unit 830 stores in the image structure 820 an address of the remaining section regions except for the text section and scrambles a relevant section within the DLL region (see FIG. 9D).

The decryption unit 830 decrypts the XOR-operated CLI header to be original by performing the XOR operation on it and extracts a Relative Virtual Address (RVA) of a stream header from the decrypted CLI header. The decryption unit 830 also deletes a keyword of the CLI header, so that the DLL region cannot be found through a keyword search in the memory (see FIG. 9E).

The decryption unit 830 decrypts each XOR-operated stream header to be original by performing the XOR operation on it, decrypts the remaining streams except for #~ through the decrypted stream headers, and stores the decrypted streams in the memory region other than the DLL region. The decryption unit 830 stores in the image structure 820 an address of each stream stored in the memory region other than the DLL region and scrambles the regions of the decrypted streams of the DLL (see FIG. 9F).

The decryption unit 830 decrypts tables within the XOR-operated region #~ to be original by performing the XOR operation on it and stores in the memory region other than the DLL region tables (module, typeref, typedef, method, and field) within the decrypted region #~. The decryption unit 830 stores in the image structure 820 addresses of tables within the region #~ stored in the memory region other than the DLL region and scrambles the regions of the decrypted streams of the DLL (see FIG. 9G).

Meanwhile, the decryption unit 830 stores in the memory region other than the DLL region only the header of the tables within the region #~ decrypted in the image structure 820 and leaves the method in the DLL region.

The decryption unit 830 decrypts an execution code to be original by performing the XOR operation on the execution code stored in the address of the XOR-operated execution code by using the header-related information stored in the image structure 820.

The decryption unit 830 decrypts a code region within the XOR-operated text section and the remaining regions of the text section to be original by performing the XOR operation and populates unnecessary regions such as the remaining regions except for the code region of the section table within the DLL and the PE header with predetermined values, that is, meaningless values.

Figure 10:
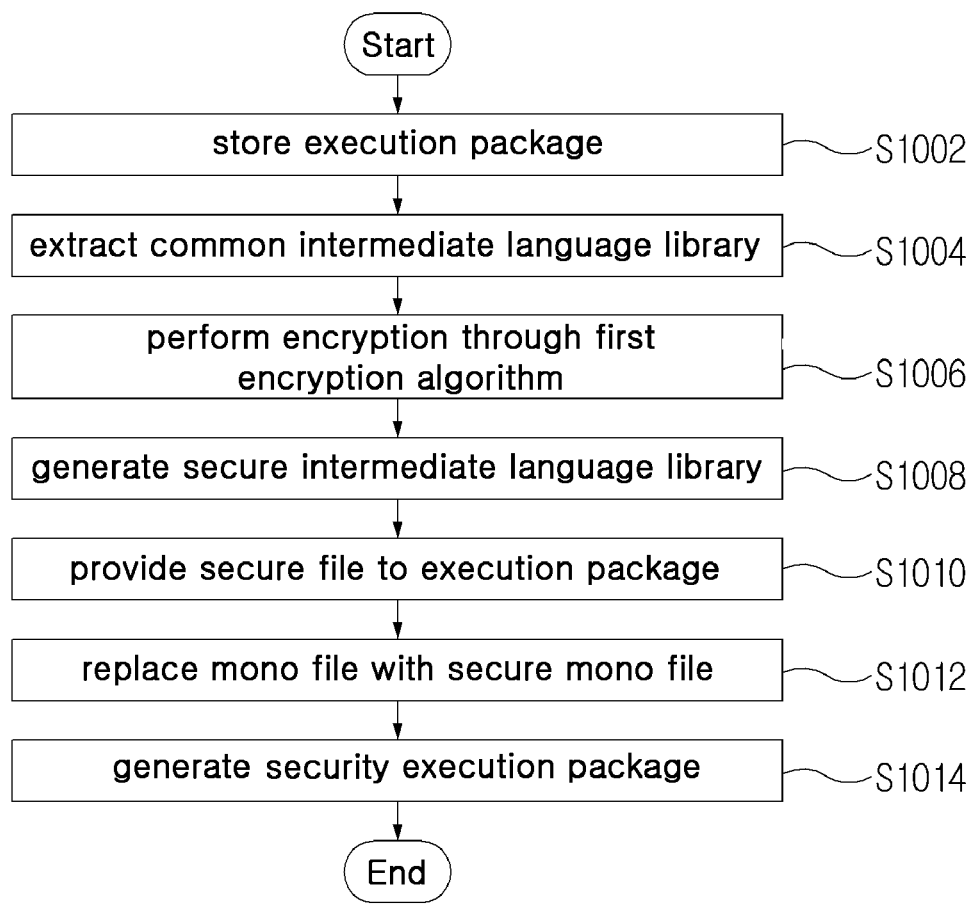
FIG. 10 is a flowchart illustrating a security providing method for a common intermediate language according to an embodiment of the present disclosure.

FIG. 10 is a flowchart illustrating a security providing method for a common intermediate language according to an embodiment of the present disclosure.

The security providing device 120 stores an execution package, for example, a unity package, generated by assembling an execution engine library and an intermediate language library generated by compiling a plurality of script files in S1002.

The intermediate language extraction unit 510 extracts the intermediate language library from the execution package in S1004.

The encryption unit 520 encrypts the entire intermediate language library extracted by the intermediate language extraction unit 510 through a first encryption algorithm in S1006, and generates a secure intermediate language library by encrypting the encrypted intermediate language library through a second encryption algorithm in S1008.

The secure file generation unit 530 generates a secure file by encrypting an encryption key value of the first encryption algorithm of the encryption unit 520 through the second encryption algorithm and provides the generated secure file to the execution package in S1010.

The file replacement unit 540 replaces the intermediate language library of the execution package with the secure intermediate language library encrypted by the encryption unit 520 and replaces a mono file of the execution package with a secure mono file including an image structure and a decryption unit which corresponds to the encryption unit 520 in S1012.

The packet assembly unit 550 generates a security execution package by assembling an execution engine library, the secure intermediate language library and the secure mono file replaced by the file replacement unit 540, and the secure file provided by the secure file generation unit 530 in S1014.

Figure 11:
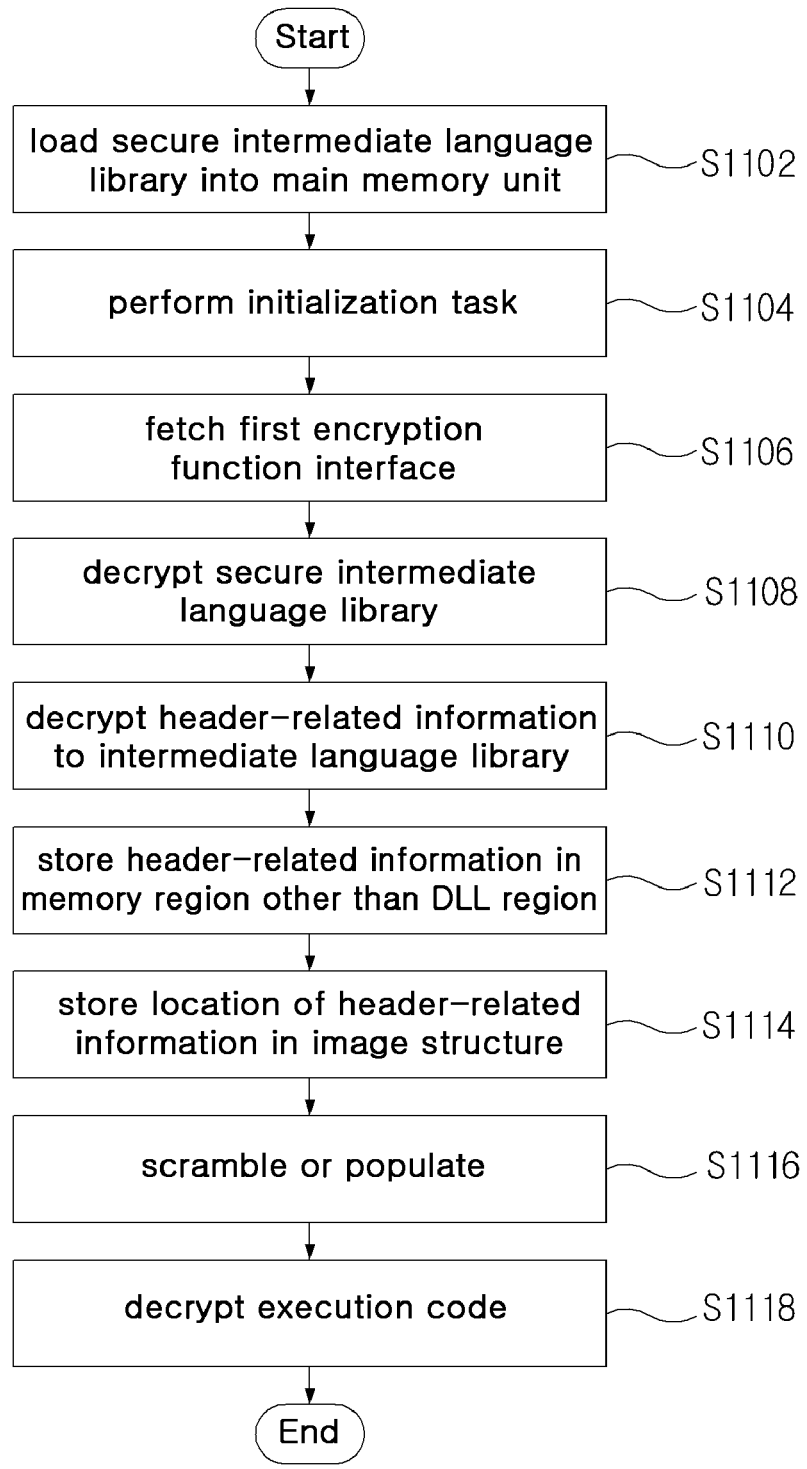
FIG. 11 is a flowchart illustrating a security executing method for a common intermediate language according to another embodiment of the present disclosure.

FIG. 11 is a flowchart illustrating a security executing method for a common intermediate language according to another embodiment of the present disclosure.

The execution engine unit 810 loads a secure intermediate language library into the main memory unit according to the operation in the execution engine library in S1102. The secure intermediate language library is generated by encrypting the intermediate language library through a first encryption algorithm and encrypting the encrypted intermediate language library through a second encryption algorithm.

When the secure intermediate language library is loaded into the main memory unit, the image structure 820 performs an initialization task required for the secure intermediate language library in S1104. The image structure 820 fetches a first decryption function interface related to the first encryption algorithm and a second decryption function interface related to the second encryption algorithm from the secure file in S1106.

The decryption unit 830 decrypts the secure intermediate language library through the second decryption function interface fetched from the image structure 820 in S1108. The encrypted intermediate language library is maintained in an intermediate language library region of the main memory unit.

The decryption unit 830 decrypts header-related information of the encrypted intermediate language library to the original intermediate language library through the first decryption function interface fetched from the image structure 820 in S1110. The decryption unit 830 stores in a memory region other than the intermediate language library region at least one piece of the header-related information of the intermediate language library in S1112, and stores in the image structure 820 a location of the header-related information stored in the memory region other than the intermediate language library region in S1114.

When the header-related information is stored in the memory region other than the intermediate language library region, the decryption unit 830 scrambles the intermediate language library region in which the header-related information is stored or populates the intermediate language library region with meaningless values in S1116.

The decryption unit 830 decrypts an execution code stored in the address of the XOR-operated execution code to be original by performing the XOR operation on it by using the header-related information stored in the image structure 820 in S1118.

The embodiments of the present disclosure are merely examples of the technical idea of the present disclosure and the scope of the present disclosure should be interpreted by the claims. Further, it can be understood by those skilled in the art that various modifications and changes can be made without departing from the essential features of the present disclosure and all technical ideas within the equivalent range to the present disclosure should be construed as being included in the scope of the present disclosure.

What is claimed is:

1. An apparatus for providing security that stores an execution package generated by assembling an execution engine library and an intermediate language library generated by compiling a plurality of files, the apparatus comprising:

an intermediate language extraction unit configured to extract the intermediate language library from the execution package;

an encryption unit configured to provide a secure intermediate language library by encrypting the intermediate language library extracted from the intermediate language extraction unit through a first encryption algorithm and encrypting the encrypted intermediate language library through a second encryption algorithm; and a file replacement unit configured to replace the intermediate language library of the execution package with the secure intermediate language library encrypted by the encryption unit and replace a mono file of the execution package with a secure mono file including an image structure and a decryption unit which corresponds to the encryption unit, wherein, when the secure intermediate language library is executed, the secure mono file loads the secure intermediate language library into a main memory as one image and stores in the image structure a start address of each part of the decrypted intermediate language library in order to access an execution code.

2. The apparatus of claim 1, further comprising a secure file generation unit configured to generate a secure file by encrypting an encryption key value of the first encryption algorithm through the second encryption algorithm.

3. The apparatus of claim 2, further comprising a package assembly unit configured to generate a security execution package by assembling the execution engine library, the secure intermediate language library and the secure mono file replaced by the file replacement unit, and the secure file provided by the secure file generation unit.

4. The apparatus of claim 1, wherein the first encryption algorithm is an XOR operation algorithm, and the second encryption algorithm is an Advanced Encryption Standard (AES) algorithm.

5. A method of providing security, the method comprising:

storing an execution package generated by assembling an execution engine library and an intermediate language library generated by compiling a plurality of files;

extracting the intermediate language library from the execution package;

encrypting the intermediate language library extracted from the execution package through a first encryption algorithm;

generating a secure intermediate language library by encrypting the encrypted intermediate language library through a second encryption algorithm;

replacing the intermediate language library of the execution package with the secure intermediate language library generated in the generating of the secure intermediate language library; and replacing a mono file of the execution package with a secure mono file including an image structure and a decryption unit which corresponds to the first encryption algorithm and the second encryption algorithm, wherein, when the secure intermediate language library is executed, the secure mono file loads the secure intermediate language library into a main memory as one image and stores in the image structure a start address of each part of the decrypted intermediate language library in order to access an execution code.

6. The method of claim 5, further comprising generating a secure file by encrypting an encryption key value of the first encryption algorithm through the second encryption algorithm.

7. The method of claim 6, further comprising generating a security execution package by assembling the execution engine library, the secure intermediate language library and the secure mono file replaced in the replacing, and the secure file provided in the generating of the secure file.

8. A security system, comprising:

a memory; and a processing system coupled to the memory and configured to control the security system to:

store, in the memory, an execution package generated by assembling an execution engine library and an intermediate language library generated by compiling a plurality of files;

extract the intermediate language library from the execution package;

encryot the intermediate language library extracted from the execution package through a first encryption algorithm;

generate a secure intermediate language library by encrypting the encrypted intermediate language library through a second encryption algorithm;

replace the intermediate language library of the execution package with the secure intermediate language library generated in the generating of the secure intermediate language library; and replace a mono file of the execution package with a secure mono file including an image structure and a decryptor information corresponding to the first encryption algorithm and the second encryption algorithm, wherein, when the secure intermediate language library is executed, the secure mono file is configured to load the secure intermediate language library into the memory as one image and store in the image structure a start address of each part of the decrypted intermediate language library in order to access an execution code.

9. The security system of claim 8, wherein the processing system is further configured to control the security system to generate a secure file by encrypting an encryption key value of the first encryption algorithm through the second encryption algorithm.

10. The security system of claim 9, wherein the processing system is further configured to generate a security execution package by assembling the execution engine library, the secure intermediate language library and the secure mono file replaced in the replacing, and the secure file provided in the generating of the secure file.

* * * * *